(12) United States Patent
Verborgt et al.

(10) Patent No.: US 7,241,504 B2
(45) Date of Patent: Jul. 10, 2007

(54) DIOLS FORMED BY RING-OPENING OF EPOXIES

(75) Inventors: Jozef Verborgt, Clearwater, FL (US); Arthur Anthony Webb, Fort Washington, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 548 days.

(21) Appl. No.: 10/346,099

(22) Filed: Jan. 17, 2003

(65) Prior Publication Data

US 2004/0142177 A1 Jul. 22, 2004

(51) Int. Cl.
*B32B 27/40* (2006.01)
*B32B 27/04* (2006.01)
*B32B 27/06* (2006.01)
*C08G 18/08* (2006.01)
*C08L 75/04* (2006.01)

(52) U.S. Cl. .............................. 428/423.1; 428/297.4; 428/297.7; 528/85; 528/110; 528/119

(58) Field of Classification Search ................ 568/715, 568/763; 528/110; 428/423.1
See application file for complete search history.

(56) References Cited

U.S. PATENT DOCUMENTS

| | | | | | |
|---|---|---|---|---|---|
| 2,700,030 | A | * | 1/1955 | Gustav et al. ............... | 568/613 |
| 4,196,243 | A | * | 4/1980 | Sachs et al. ................. | 428/147 |
| 4,284,574 | A | * | 8/1981 | Bagga ......................... | 549/555 |
| 4,417,022 | A | * | 11/1983 | Chang et al. ................ | 524/598 |
| 4,430,486 | A | * | 2/1984 | Chang et al. ................ | 525/440 |
| 4,551,517 | A | * | 11/1985 | Herold et al. ................ | 528/60 |
| 4,554,188 | A | * | 11/1985 | Holubka et al. .......... | 427/393.5 |
| 5,066,733 | A | * | 11/1991 | Martz et al. ................ | 525/455 |
| 6,331,583 | B1 | | 12/2001 | Walker | |
| 2002/0086923 | A1 | | 7/2002 | Noda et al. | |
| 2002/0091195 | A1 | | 7/2002 | Paar et al. | |
| 2002/0091223 | A1 | | 7/2002 | Walker et al. | |

OTHER PUBLICATIONS

Tanzer et al., "Reaction of Glycidyl Ethers With Aliphatic Alcohols In The Presence Of Benzyl Dimethylamine" Polymer, 1993, 3520-3525, vol. 34 No. 16.
Tanzer et al., "Crosslinking Behavior of Diolmodified Epoxies" Polymer, 1998, 183-188, vol. 20.

* cited by examiner

*Primary Examiner*—Michael J. Feely
(74) *Attorney, Agent, or Firm*—John J. Karasek; Joseph T. Grunkemeyer

(57) ABSTRACT

A polyol monomer comprising the formula:

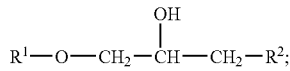

$R^1$ is aliphatic or aromatic, $R^2$ is aliphatic, aromatic, ester, ether, or acrylic, and $R^1$ contains a hydroxyl group, $R^2$ contains —O—$CH_2$—CH(OH)—, or both. $R^1$ is not a $C_4$ or larger linear, unsubstituted aliphatic when $R^2$ is a residue of a bisphenol. The polyol monomer may be made by reacting an epoxy and an alcohol. Either the epoxy contains more than one epoxide groups, the alcohol is a polyol, or both. A thermoset made by reacting the polyol monomer with a polyisocyanate.

32 Claims, No Drawings

DIOLS FORMED BY RING-OPENING OF EPOXIES

BACKGROUND OF THE INVENTION

1. Field of the Invention

The invention relates generally to the formation of diols and polyols and formation of polyurethanes therefrom.

2. Description of the Prior Art

Epoxy compounds have been reacted with bisphenols to form high molecular weight polymers. These reactions typically result in solvent based resins that can then be cured with isocyanates.

Polyurethanes have been made from alcohols and isocyanates. These reactions may cure quickly, even at low temperatures. The polymers are generally flexible, tough, and have good adhesion, but have inferior chemical resistance in comparison to epoxy resins. Polyurethanes can suffer from cathodic disbondment, in general due to the nature of the diols, which are susceptible to hydrolysis under alkaline conditions. Polyether diols are also used, but suffer from high water pick-up. The traditional focus for polyurethanes has been for the decorative and automotive markets.

It is known that a polymer containing multiple hydroxyl groups can be cross-linked with isocyanates. However, the starting polymer may be a solid or have a high viscosity. The polymer may need to be dissolved in a solvent in order to perform the cross-linking. The solvent must then be removed from the system, typically by evaporation.

It is also known that polymers with terminal hydroxyl groups, such as poly(ethylene glycol), may also be cross-linked with an isocyanate. These polymers may also be a solid or have a high viscosity, requiring the use of a solvent.

It is also known that a low molecular weight polyol, such as low molecular weight poly(ethylene glycol) can be cross-linked with an isocyanate. These polyols suffer from the drawback that they are not compatible or soluble in the isocyanate.

Low molecular weigh esters and acrylics have been reacted with isocyanates to form thermosets. However, these polymers suffer from hydrolysis under alkaline conditions.

There is need for a polyol monomer that is compatible with isocyanates, such it can cross-link with a polyisocyanate without the need for solvent. The desirable system would have the chemical resistance of a polyepoxide and the curing and mechanical properties of a polyurethane.

SUMMARY OF THE INVENTION

The invention comprises a polyol monomer comprising the formula:

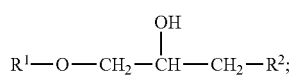

$R^1$ is selected from the group consisting of aliphatic and aromatic and $R^2$ is selected from the group consisting of aliphatic, aromatic, ester, ether, or acrylic. Either $R^1$ contains a hydroxyl group, $R^2$ contains —O—CH$_2$—CH(OH)—, or both. $R^1$ is not a $C_4$ or larger linear, unsubstituted aliphatic when $R^2$ is a residue of a bisphenol.

The invention further comprises a thermoset formed by reacting a polyisocyanate with the above polyol monomer.

The invention further comprises a process of making a thermoset comprising the steps of: providing an epoxy and an alcohol; wherein either the epoxy contains more than one epoxide groups, the alcohol is a polyol, or both; reacting the epoxy with the alcohol to make a polyol monomer; and reacting the polyol monomer with a polyisocyanate.

The invention further comprises a process of making a thermoset comprising the steps of: providing the above polyol monomer and reacting the polyol monomer with a polyisocyanate.

DETAILED DESCRIPTION OF THE PREFERRED EMBODIMENTS

The polyol monomer can be made by reacting certain classes of alcohols with certain classes of epoxy compounds. Instead of the usual polymerization of these materials, a smaller molecule is formed. There may be no chain growth beyond a central epoxy or alcohol reacting in one or more epoxide ring-opening reactions. The resulting polyol monomer will have at least one secondary hydroxyl group and one or more primary and/or secondary hydroxyl groups. The monomer must have at least two hydroxyl groups in order to form a thermoset with a polyisocyanate. This may be achieved by using certain combinations of alcohol, polyols, and epoxies. The polyol monomer may be nonsaponifiable.

In one embodiment, shown in formula (1), a monofunctional alcohol is reacted with a polyepoxy in a ring opening reaction. Throughout the specification and claims, the prefix poly-, as in polyol and polyfunctional, means two or more of the specified functional group. This results in a polyol monomer having at least two secondary hydroxyl groups, one for each reacting epoxide group. R' and R" may be any groups that may be formed from materials disclosed herein.

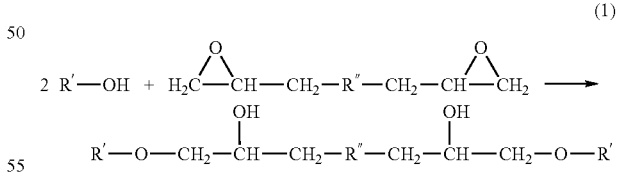

Examples of this embodiment include, but are not limited to, the products of the reaction of methanol with diglycidyl ether of bisphenol F or triglycidyl ether of glycerol.

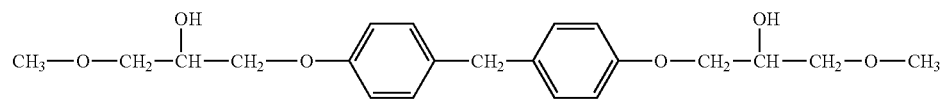

-continued

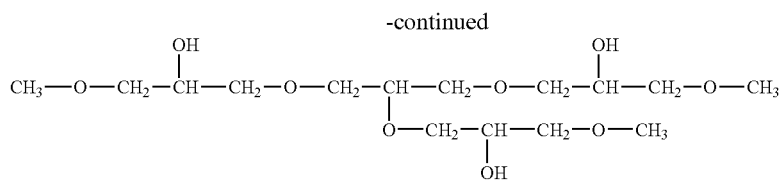

The reaction of n-butanol or longer linear, unsubstituted, aliphatic alcohols with a diglycicyl ether of a bisphenol compound produces a polyol monomer that may have a high viscosity. Such polyol monomers may be less suitable for forming a thermoset with a polyisocyanate at room temperature. However, the use of an alcohol additive may reduce the viscosity to the point where such a thermoset may be made. Alternatively, the reaction could be heated to reduce the viscosity.

In another embodiment, shown in formula (2), a polyfunctional alcohol is reacted with a monoepoxy. This results in a polyol monomer having a secondary hydroxyl group from the epoxy and another hydroxyl group, either primary or secondary, from the alcohol.

(2)

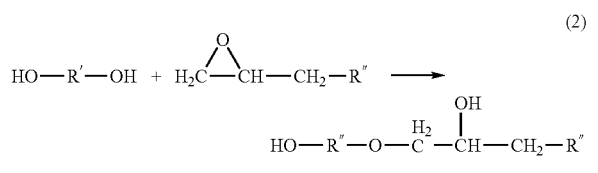

Examples of this embodiment include, but are not limited to, the product of the reaction of 1,2-propane-diol with butyl glycidyl ether.

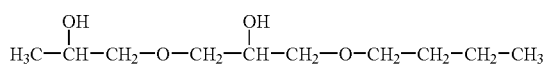

If enough epoxy is present, then the alcohol can react with multiple epoxies. The result has at least two secondary hydroxyl groups, one for each reacting epoxide group, as shown in formula (3).

(3)

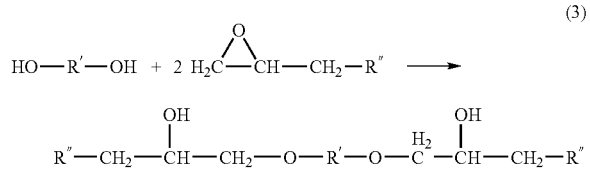

In another embodiment, a polyol is reacted with a polyepoxy. The alcohol is present in an excess amount to avoid making a high molecular weight polymer. When enough alcohol is present, the alcohol end-caps the epoxy without chain extension. This scheme is similar to that of a monofunctional alcohol and polyepoxy. The resulting polyol monomer has additional hydroxyl groups, either primary or secondary, from the alcohol, as shown in formula (4).

(4)

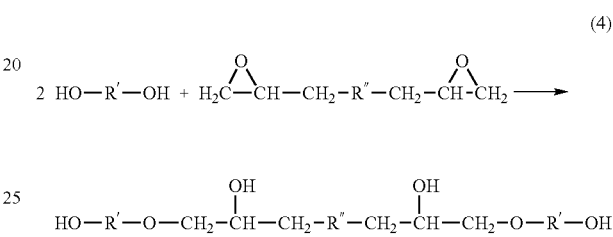

Examples of this embodiment include, but are not limited to, the product of the reaction of 1,2-ethane-diol with diglycidyl ether of bisphenol A.

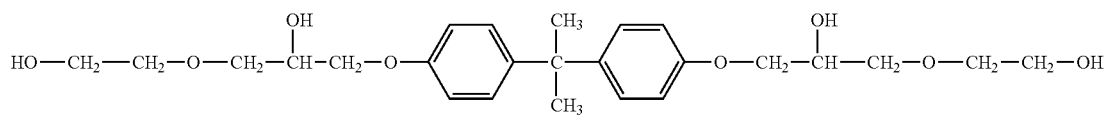

All these embodiments are encompassed by the general structure:

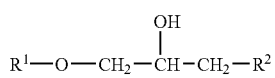

$R^1$ can be either aliphatic or aromatic, and $R^2$ can be aliphatic, aromatic, ester, ether, or acrylic. The monomer has at least two hydroxyl groups: the one shown in the general structure, and at least one in either $R^1$ or $R^2$. When the alcohol is a polyol, $R^1$ contains a hydroxyl group (formulas (2), (3), and (4)). When the epoxy is a polyepoxy, $R^2$ contains —O—$CH_2$—CH(OH)— (formulas (1) and (4)). Such an $R^2$ group contains a hydroxyl group. It may also be the case that both $R^1$ and $R^2$ contain hydroxyl groups (formula (4)).

The polyol monomer may have a viscosity suitable for reacting with an isocyanate under ambient conditions in the absence of a solvent. When the viscosity is too high, it may not be possible to achieve adequate mixing with the polyisocyanate to form a thermoset. It may also be possible to reduce the viscosity of the polyol monomer to a suitable viscosity by reacting it with the polyisocyanate at an elevated temperature. Suitable polyol monomers may have molecular weights in the range of about 200 to about 3000.

Reactions between a monofunctional alcohol and a monoepoxy do not ordinarily produce a polyol monomer. The result has a single secondary hydroxyl group. Such a compound can be used as an additive as described below. An exception would be a diepoxy, where one epoxide group had previously reacted with an alcohol, making a monoepoxy having a hydroxyl group. Such a monoepoxy could be reacted a monofunctional alcohol to produce a polyol monomer. The product would be that of formula (1). Another exception would be a diol, where one hydroxyl group had previously reacted with an epoxy. The other hydroxyl group could then react with another epoxy. The product would be that of formula (3).

The $R^1$—O— group can be described as a residue of an alcohol, meaning that this moiety originated in an alcohol that reacted with an epoxy. Suitable alcohols include, but are not limited to, methanol, ethanol, propanol, butanol, 1,2-ethane-diol, isopropanol, 1,2-propane-diol, 1,3-propane-diol, 1,3-cyclohexane-diol, a glycol, and a $C_1$–$C_{15}$ alcohol.

The $R_2$—$CH_2$—CH(OH)—$CH_2$— group can be described as a residue of an epoxy, meaning that this moiety originated in an epoxy that reacted with an alcohol. Suitable epoxies include, but are not limited to, a glycidyl ether, butyl glycidyl ether, phenyl glycidyl ether, p-tertiary butyl phenyl glycidyl ether, $C_8$–$C_{14}$ alkyl glycidyl ether, cresyl glycidyl ether, 2-ethylhexyl glycidyl ether, p-cumenol glycidyl ether, glycidyl ester of neodecanoic acid, diglycidyl ether of cyclohexane, diglycidyl ether of resorcinol, diglycidyl ether of bisphenol A, diglycidyl ether of bisphenol F, diglycidyl ether of 2-methyl resorcinol, diglycidyl ether of 1,4-butanediol, diglycidyl ether of neopentyl glycol, diglycidyl ether of 2,2-di(1,4-cyclohexyl)propane, and triglycidyl ether of glycerol.

It is to be understood that polyol monomers made from combinations of more than one alcohol, glycols and/or epoxy are within the scope of the claimed invention. Similarly, the inclusion of an amine, in the manner disclosed in the U.S. patent application Ser. No. 10/346,061, filed on Jan. 07, 2003, incorporated by reference, is also within the scope of the claimed invention. This is also the case for thermosets made from these polyol monomers and methods of making the same.

The $R^2$ can be such that it contains no more than one —O—$CH_2$—CH(OH)— group in the same linear chain as $R^1$. This polyol monomer would not include a polymerized epoxy. The polyol monomer may also be soluble in an isocyanate. Generally, a lower molecular weight polyol may be less compatible with isocyanates because they contain a higher percentage of polar hydroxyl groups.

The reaction of the alcohol and the epoxy can be performed by any means known in the art. The reaction can be catalyzed by bases, Lewis acids, and strong acids, such as perchloric acid, other per-acids, and sulphuric acid. The reaction may be performed in a solvent, which may be distilled off before reacting with the polyisocyanate. Primary alcohols may result in better viscosities, although the reaction rate with the epoxy may be slow. Glycols may have better reactivity, although the viscosity may be higher.

The reaction may be controlled through steric hindrance by choosing the starting materials to form a secondary or tertiary structure. The molar ratio of the alcohol and epoxy may be chosen to result in a desired degree of reaction and quantity of hydroxyl groups. The polyol monomer may be less compatible with aliphatic isocyanates than with other isocyanates.

A thermoset can be formed by reacting the polyol monomer with a polyisocyanate according to formula (5).

(5)

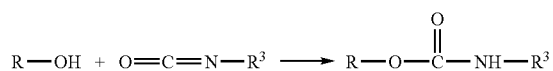

R—OH represents the polyol monomer as described above. The hydroxyl group can be from the original alcohol, or can be generated from the reaction of alcohol and epoxy. The formula shows only a single cross-link. The R group has at least one other hydroxyl group, which may be a hydroxyl group that was part of the original alcohol, or a hydroxyl group that resulted from the ring-opening reaction. The $R^3$ group has at least one other isocyanate group. These functional groups allow for cross-linking so that a thermoset is formed. An example possible structure of the thermoset is shown below. The polyol monomer was made from triglycidyl ether of glycerol and methanol. Such a polyol monomer can then be reacted with biuret of hexamethylene diisocyanate.

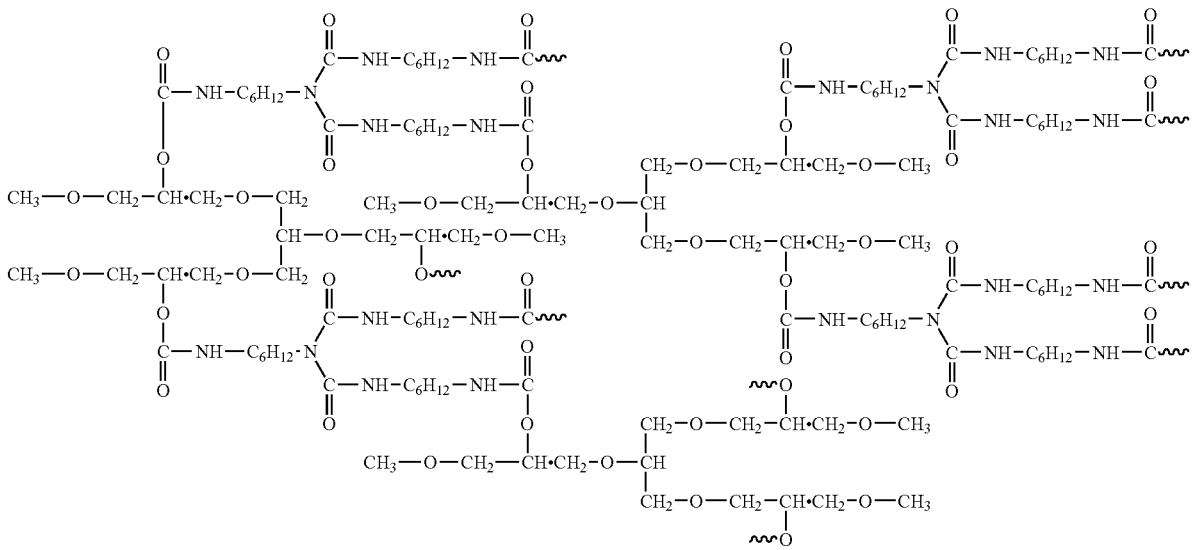

When the polyol monomer is soluble in the polyisocyanate, the reaction can be solvent free. This results in no release of volatile organic compounds. The reaction can be performed by any means known in the art. The reaction can be catalyzed by any catalyst known in the art to catalyze this reaction including, but not limited to, organometallic catalysts including those based on Sn, K, Ti, and Zn and tertiary amine catalysts.

There are three commonly available types of isocyanates. Aromatics include toluene diisocyanate and diphenyl methane diisocyanate. Aliphatics include hexamethylene diisocyanate dimers and trimers, 4,4'-dicyclohexylmethane-diisocyanate, and isophorone diisocyanate. Others include tetramethylxylene diisocyanate. Other suitable polyisocyanates include, but are not limited to, hexamethylene diisocyanate, diphenylmethane diisocyanate, cycloaliphatic polyisocyanates, aliphatic polyisocyanates, an isocyanurate, biuret of toluene diisocyanate, and biuret of hexamethylene diisocyanate.

These monomeric isocyanates may have some hazards in their high reactivity and health risks. These problems may be improved by the used of polymeric isocyanates such as isocyanurate, adduct of TDI and glycerin, biuret of TDI, and biuret of HDI. As used herein, the term "polyisocyanate" includes both monomeric isocyanates and polymeric isocyanates that contain more than one isocyanate functional group, and the mention of any polyisocyanate includes both monomeric and polymeric forms.

A variety of polyisocyanates are commercially available from Bayer including Desmodur N aliphatic isocyanates based on hexamethylene diisocyanate (N3200, N3300, and N3600), Desmodur W bis(4-isocyanatocyclohexyl) methane, and Mondur CD, MRS, and E based on diphenylmethane diisocyanate.

Generally, primary hydroxyl groups are more reactive with the polyisocyanate than secondary hydroxyl groups. The alcohol, epoxy, and polyisocyanate can be chosen to produce a thermoset with desired properties including degree of cross-linking, mechanical properties, adhesion, and chemical resistance.

The polyol monomer and the polyisocyanate may be mixed in a stoichiometric ratio. The polyol monomer and the polyisocyanate may be stored separately and mixed together when needed to make the thermoset. The mixture can be applied as a coating, as the mixture may have a low viscosity suitable for forming coatings. The mixture can then cure to form the thermoset. Curing times may be from a few seconds to the order of minutes and may be done at any temperatures including, but not limited to, about 10° C. or below. The reaction may proceed more favorably when there is no contamination by water. Water may cause porosity or foaming.

The polyol monomer and the polyisocyanate can be mixed together as they are sprayed onto a surface to be coated with the thermoset. This method allow for little to no reaction until the mixture has been applied to the surface. The spraying may be done with plural component spray equipment, which may include a static mixer and/or an impingement mixer.

It may be desirable to react the polyol monomer and polyisocyanate with an alcohol additive so that the viscosity of the reaction mixture is lower. The additive has a lower viscosity than that of the polyol monomer. The additive may be a monofunctional alcohol or a polyol. A monofunctional alcohol may be made by reacting a monofunctional alcohol with a monoepoxy, as shown in formula (6). The products of formulas (1) through (4) may also be used. $R^1$ and $R^2$ may be the same or different from those in the polyol monomer. However, using the same $R^1$ and $R^2$ may not have a lower viscosity than the polyol monomer.

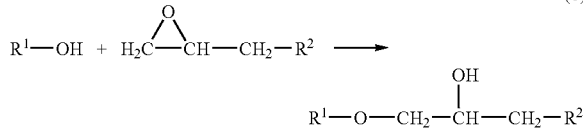

(6)

An advantage of using this monofunctional alcohol additive is that is may be chemically similar to the polyol monomer. The lower viscosity of the additive can help to reduce the viscosity of the reaction mixture, as would a solvent. However, unlike a solvent, the additive reacts with the polyol monomer and polyisocyanate and is consumed in the reaction. Since the incorporated additive is chemically similar to the polyol monomer, the properties of the thermoset are not substantially affected by the presence of the additive.

The additive may also be made by the method disclosed in the previously referenced U.S. patent application Ser. No. 10/346,061. Other low molecular weight alcohols may also be used. The choice may depend on the desired amount of viscosity reduction.

The thermoset may have desirable toughness, abrasion resistance, flexibility, and adhesion strength as is generally found in polyurethanes. The thermoset may also have the chemical resistance, including hydrolytic stability and cathodic protection, of an epoxy resin. It may be resistant to caustic soda, methanol, and hydrocarbon fuel. The properties can be adjusted to form materials from tough, hard films to soft, pliable materials, fitting a wide range of applications. The properties are highly dependant on the starting materials used. The properties may be designed into the thermoset by choosing the isocyanate or combination of isocyanates, degree of polymeric isocyanate formation, and choice of polyol monomer.

The thermoset may be useful as a coating, which can be made as described above. Suitable substrates for the coating include, but are not limited to, steel, metal, and concrete. A tank lining is one application of such a coating. Such a lining may have good adhesion and chemical resistance. It may not be necessary to use a primer or topcoat.

The thermoset may also be useful as a repair compound. Higher viscosity materials than are used for coatings may be appropriate, as the compound may fill a three-dimensional void.

A composite may also be made using the thermoset by reacting the polyol monomer and the polyisocyanate in the presence of a fiber material, such as glass fibers or carbon fibers. The fibers may impart additional mechanical strength to the composite.

Having described the invention, the following examples are given to illustrate specific applications of the invention. These specific examples are not intended to limit the scope of the invention described in this application.

EXAMPLE 1

Ring opening of diglycidyl ether of bisphenol F resin (Epon 862) with methanol—One hundred grams of Epon 862 were mixed with 100 grams of anhydrous methanol. This represented a large excess of methanol with regards to the reactive epoxy groups of the Epon 862 resin. This excess was used to avoid homopolymerization of the epoxy resin by etherification. A catalyst mixture was prepared by dissolving 1 cc (1.66 grams) of perchloric acid in 50 grams of methanol. The mixture of Epon resin and methanol were heated to 50° C. at which temperature the mixture became compatible. A total of 2 cc of the catalyst mixture was then added in small portions over a period of three hours. The addition of catalyst raised the temperature quickly to the boiling point due to the exothermic character of the ring opening reaction. After the exothermic reaction subsided the temperature was kept at the boiling point for a total reaction time of three hours. The excess of methanol was removed by vacuum distillation. The residual weight of the reaction product indicated that the conversion was nearly 100%.

EXAMPLE 2

Ring opening reaction of Epon 862 resin with ethanol— 1.500 grams of epon resin 862 were mixed with 1.500 grams of anhydrous ethanol. The amount of ethanol used represented a large excess of ethanol with regards to the reactive epoxy groups of the Epon 862 resin. This excess was used to avoid homopolymerization of the epoxy resin by etherification. A catalyst mixture was prepared by dissolving 10 cc (16.6 grams) of perchloric acid in 50 grams of anhydrous ethanol. The mixture of epon resin and ethanol was heated to 57° C. at which temperature the mixture became compatible. The catalyst was then added in small portions of 2 cc each until a total of 6 grams of perchloric acid had been added over a two hour period. This raised the temperature to the boiling point. After the exothermic reaction subsided the temperature was kept at the boiling point for one more hour. The large excess of ethanol was then be removed by vacuum distillation. The residual weight of the reaction mixture indicated that the conversion was nearly 100%.

EXAMPLE 3

Ring opening reaction of Epon 862 resin with butane diol—107 grams of Epon 862 were mixed with 81.6 grams of butane diol. This represented an excess of 25 grams or 15% of butane diol. A catalyst mixture was prepared by dissolving 2 cc (3.7 grams) of perchloric acid in 20 grams of butane diol. The reaction mixture of epon resin and butane diol was heated to 90° C. and 0.1 cc of this catalyst was added dropwise to the reaction mixture. The reaction was rather violent in nature and care needed to be taken to control the exothermic reaction by means of a water bath. The total reaction time was three hours. The excess of butane diol was removed under vacuum. (The butane-diol could also stay in the reaction mixture and serve as an alcohol additive when curing with isocyanates.) The reaction mixture was rather viscous and needed to be thinned down with an alcohol additive. Tripropylene glycol could also be used to advantage as a reactive diluent.

EXAMPLE 4

Ring opening reaction of Epon 862 with ethylene glycol—200 grams of Epon 862 resin were mixed with 150 grams of anhydrous ethylene glycol. This amount of ethylene glycol represented a rather large excess with regards to the amount of epoxy groups present in the mixture. This was done in order to eliminate or to reduce the chain extension reaction by reaction was then heated to some 80° C. and 2 cc of the catalyst mixture were added over a two hour period. The reaction was extremely exothermic in nature and needed cooling by means of a water bath. After the exotherm had subsided the mixture was kept at 120° C. for one more hour and the excess of ethylene glycol was removed under vacuum. The reaction mixture was rather viscous and needed to be thinned down with reactive diluents such as described above. Tri-propylene glycol could be used as a reactive diluent.

EXAMPLE 5

Ring opening of Epon 862 resin with 1,3 propylene glycol—Same procedure as for Example 4. The reaction was extremely exothermic and care needed to be taken by adding the catalyst only drop wise while cooling with a water bath.

EXAMPLE 6

Ring opening of Epon 862 resin with 1,2 propylene glycol—Same procedure as for Example 4. The reaction again was extremely exothermic and care needed to be taken by adding the catalyst drop wise while cooling with a water bath.

EXAMPLE 7

General procedure for forming the thermosets—The thermoset was made by mixing together a polyol monomer and a polyisocyanate. The mixture solidified without the use of a catalyst or heating. The thermoset was formed as a shaped article, such as a disk.

EXAMPLE 8

Formation of thermosets—Polyol monomers made from the reaction of methanol, propanol, and butanol with diglycidyl ether of bisphenol F were reacted with a variety of polyisocyanates including triisocyanurates, hexamethylene diisocyanates, and diphenylmethylene diisocyanates. All formed tough thermosets. These polyol monomers were less compatible with bis(4-isocyanatocyclohexyl) methane, however this problem could be resolved with the use of an alcohol additive.

Obviously, many modifications and variations of the present invention are possible in light of the above teachings. It is therefore to be understood that, within the scope of the appended claims, the invention may be practiced otherwise than as specifically described.

What is claimed is:
1. A thermoset formed by reacting a polyisocyanate with a polyol monomer;
wherein the polyol monomer comprises the formula:

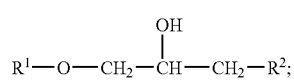

wherein $R^1$—O— is a residue of an alcohol selected from the group consisting of methanol, ethanol, propanol, butanol, 1,2-ethane-diol, isopropanol, 1,2-propane-diol, 1,3-propane-diol, 1,3-cyclohexane-diol, a glycol, and a $C_1$–$C_{15}$ alcohol;
wherein $R^2$ is selected from the group consisting of aliphatic, aromatic, ester, ether, and acrylic group; and
wherein $R^2$ contains —O—$CH_2$—CH(OH)—.

2. The thermoset of claim 1, wherein $R^2$ contains no more than one —O—$CH_2$—CH(OH)— group in the same linear chain as $R^1$.

3. The thermoset of claim 1, wherein the polyol monomer is soluble in an isocyanate.

4. The thermoset of claim 1, wherein $R^2$—$CH_2CH(OH)$—$CH_2$— is a residue of an epoxy selected from the group consisting of a diglycidyl ether, diglycidyl ether of cyclohexane, diglycidyl ether of resorcinol, diglycidyl ether of bisphenol A, diglycidyl ether of bisphenol F, diglycidyl ether of 2-methyl resorcinol, diglycidyl ether of 1,4-butanediol, diglycidyl ether of neopentyl glycol, diglycidyl ether of 2,2-di(1,4-cyclohexyl)propane, and triglycidyl ether of glycerol.

5. The thermoset of claim 1, wherein the polyisocyanate is selected from the group consisting of toluene diisocyanate, diphenyl methane diisocyanate, hexamethylene diisocyanate dimers and trimers, 4,4'-dicyclohexylmethane-diisocyanate, isophorone diisocyanate, tetramethylxylene diisocyanate, hexamethylene diisocyanate, diphenylmethane diisocyanate, cycloaliphatic polyisocyanates, aliphatic polyisocyanates, adduct of TDI and glycerin, biuret of TDI, and biuret of HDI.

6. The thermoset of claim 1, wherein the polyisocyanate and the polyol monomer, are reacted with an alcohol additive having a lower viscosity than the polyol monomer.

7. A coating comprising the thermoset of claim 1.

8. The coating of claim 7, wherein the coating is on steel, metal, or concrete.

9. A repair compound comprising the thermoset of claim 1.

10. A composite material comprising the thermoset of claim 1 and a fiber material.

11. The composite material of claim 10, wherein the fiber material is glass fiber or carbon fiber.

12. A process of making a thermoset comprising the steps of:
providing a glycidyl ether and an alcohol;
wherein the glycidyl ether contains more than one epoxide groups; reacting the glycidyl ether with the alcohol to make a polyol monomer; and
reacting the polyol monomer with a polyisocyanate.

13. The process of claim 12, wherein the polyol monomer is soluble in the polyisocyanate.

14. The process of claim 12, wherein the alcohol is selected from the group consisting of methanol, ethanol, propanol, butanol, 1,2-ethane-diol, isopropanol, 1,2-propane-diol, 1,3-propane-dial, 1,3-cyclohexane-diol, a glycol, and a $C_1$–$C_{15}$ alcohol.

15. The process of claim 12, wherein the glycidyl ether is selected from the group consisting of diglycidyl ether of cyclohexane, diglycidyl ether of resorcinol, diglycidyl ether of bisphenol A, diglycidyl ether of bisphenol F, diglycidyl ether of 2-methyl resorcinol, diglycidyl ether of 1,4-butanediol, diglycidyl ether of neopentyl glycol, diglycidyl ether of 2,2-di(1,4-cyclohexyl)propane, and triglycidyl ether of glycerol.

16. The process of claim 12, wherein the polyisocyanate is selected from the group consisting of toluene diisocyanate, diphenyl methane diisocyanate, hexamethylene diisocyanate dimers and trimers, 44'-dicyclohexylmethane-diisocyanate, isophorone diisocyanate, tetramethylxylene diisocyanate, hexamethylene diisocyanate, diphenylmethane diisocyanate, cycloaliphatic polyisocyanates, aliphatic polyisocyanates, adduct of TDI and glycerin, biuret of TDI, and biuret of HDI.

17. The process of claim 12, wherein the step of reacting the polyol monomer with the polyisocyanate is solvent-free.

18. The process of claim 12, wherein the step of reacting the glycidyl ether with the alcohol is catalyzed by perchloric acid or sulphuric acid.

19. The process of claim 12, wherein the step of reacting the polyol monomer with the polyisocyanate comprises reacting with an alcohol additive having a lower viscosity than the polyol monomer.

20. The process of claim 12, wherein the step of reacting the polyol monomer with the polyisocyanate is catalyzed by a catalyst selected from the group consisting of an organometallic catalyst, an organotin catalyst, an organozinc catalyst, an organopotassium catalyst, an organotitanium catalyst, and a tertiary amine catalyst.

21. The process of claim 12, wherein the step of reacting the polyol monomer with the polyisocyanate is performed at or below about 10° C.

22. A process of making a thermoset comprising the steps of:
providing a polyol monomer comprising

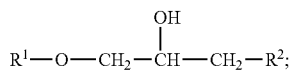

wherein $R^1$ is selected from the group consisting of aliphatic and aromatic;
wherein $R^2$ is selected from the group consisting of aliphatic, aromatic, ester, ether, and acrylic group;
wherein $R^2$ contains —O—$CH_2$—CH(OH)—; and
reacting the polyol monomer with a polyisocyanate.

23. The process of claim 22, wherein $R^2$ contains no more than one —O—$CH_2$—CH(OH)— group in the same linear chain as $R^1$.

24. The process of claim 22, wherein the polyol monomer is soluble in an isocyanate.

25. The process of claim 22, wherein $R^1$—O— is a residue of an alcohol selected from the group consisting of methanol, ethanol, propanol, butanol, 1,2-ethane-diol, isopropanol, 1,2-propane-diol, 1,3-propane-diol, 1,3-cyclohexane-diol, a glycol, and a $C_1$–$C_{15}$ alcohol.

26. The process of claim 22, wherein $R^2$—$CH_2$—CH(OH)—$CH_2$— is a residue of glycidyl ether selected from the group consisting of a diglycidyl ether of cyclohexane, diglycidyl ether of resorcinol, diglycidyl ether of bisphenol A, diglycidyl ether of bisphenol F, diglycidyl ether of 2-methyl resorcinol, diglycidyl ether of 1,4-butanediol, diglycidyl ether of neopentyl glycol, diglycidyl ether of 2,2-di(1,4-cyclohexyl)propane, and triglycidyl ether of glycerol.

27. The process of claim 22, wherein the polyisocyanate is selected from the group consisting of toluene diisocyanate, diphenyl methane diisocyanate, hexamethylene diisocyanate dimers and trimers, 4,4dicyclohexylmethane-diisocyanate, isophorone diisocyanate, tetramethylxylene diisocyanate, hexamethylene diisocyanate, diphenylmethane diisocyanate, cycloaliphatic polyisocyanates, aliphatic polyisocyanates, adduct of TDI and glycerin, biuret of TDI, and biuret of HDI.

28. The process of claim 22, wherein the reacting step is solvent-free.

29. The process of claim 22, wherein the reacting step comprises reacting with an alcohol additive having a lower viscosity than the polyol monomer.

30. The process of claim 22, wherein the reacting step is catalyzed by a catalyst selected from the group consisting of an organometallic catalyst, an organotin catalyst, an organozinc catalyst, an organopotassium catalyst, an organotitanium catalyst, and a tertiary amine catalyst.

31. The process of claim 22, wherein the reacting step is performed at or below about 10° C.

32. The process of claim 22, wherein the polyol monomer and the polyisocyanate are mixed together as they are sprayed onto a surface.

* * * * *